H. E. BORGER.
DYNAMO ELECTRIC MACHINE ARMATURE.
APPLICATION FILED DEC. 30, 1916.
1,416,256.
Patented May 16, 1922.
2 SHEETS—SHEET 2.
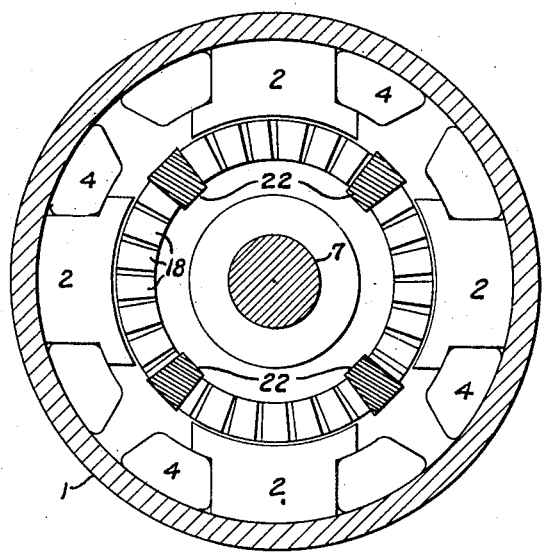
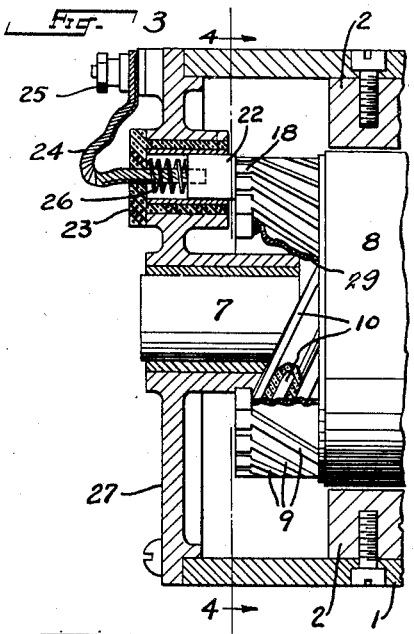
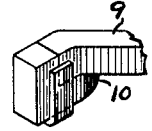
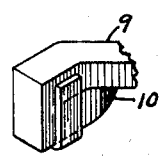
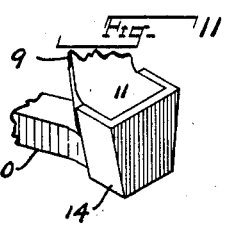
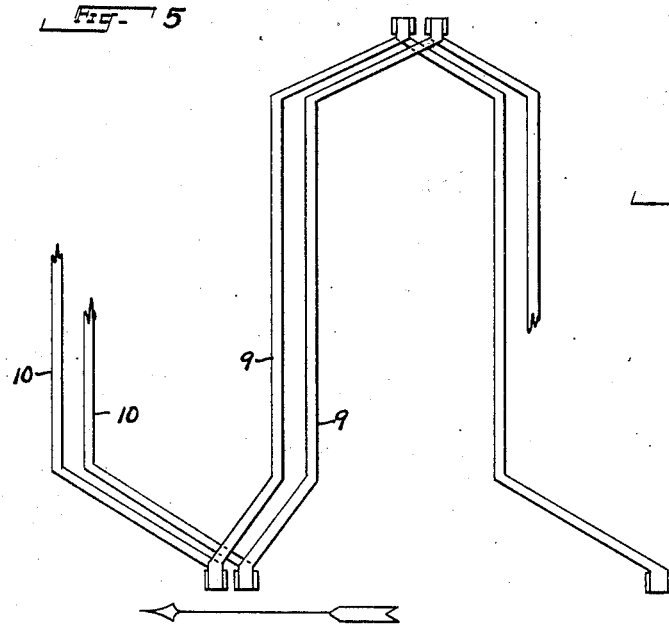
INVENTOR
HENRY E. BORGER
Albion D. T. Libby
ATTORNEY

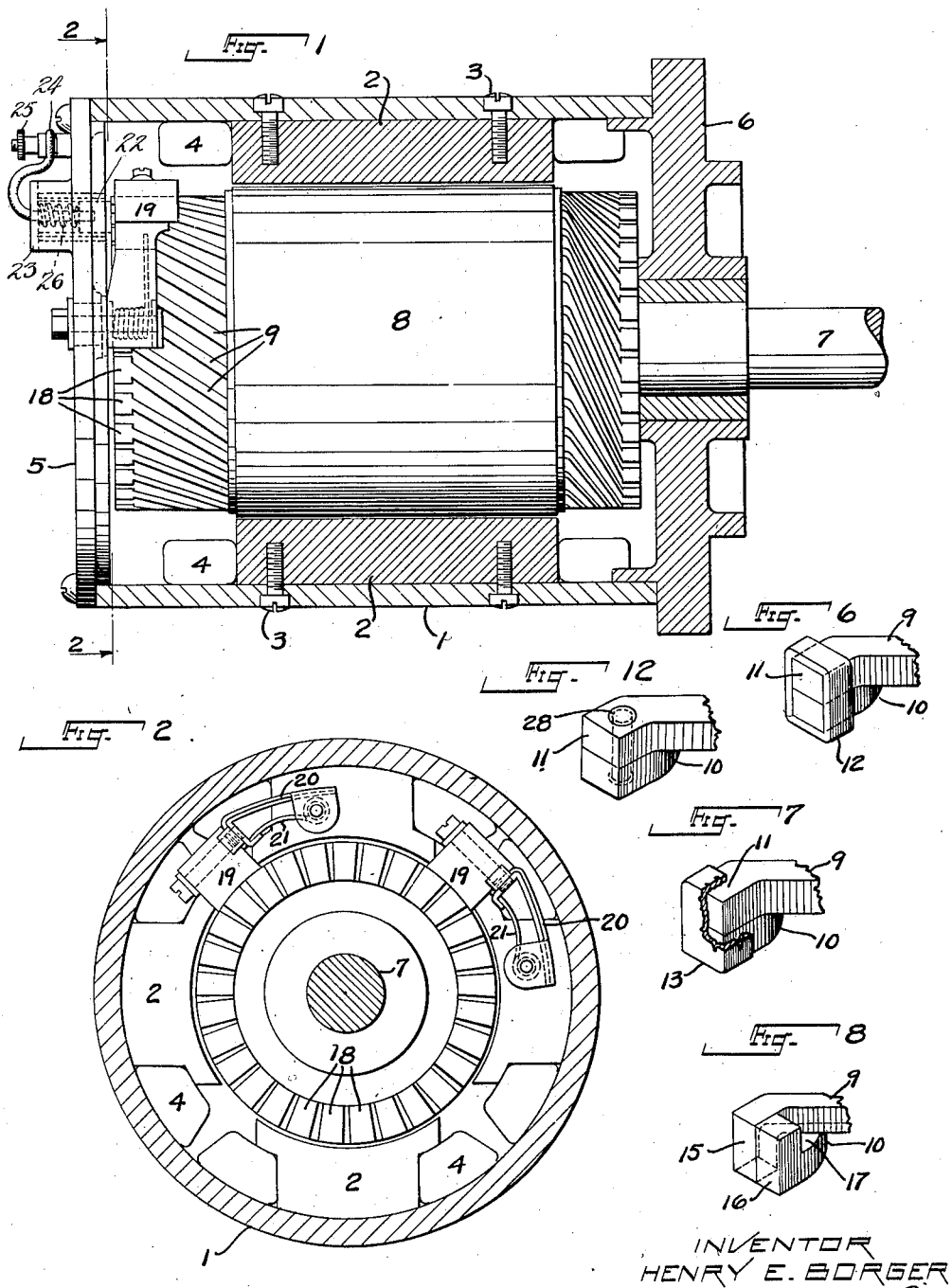

UNITED STATES PATENT OFFICE.

HENRY E. BORGER, OF NEWARK, NEW JERSEY, ASSIGNOR TO SPLITDORF ELECTRICAL COMPANY, OF NEWARK, NEW JERSEY.

DYNAMO-ELECTRIC-MACHINE ARMATURE.

1,416,256.  Specification of Letters Patent.  Patented May 16, 1922.

Application filed December 30, 1916. Serial No. 139,719.

*To all whom it may concern:*

Be it known that I, HENRY E. BORGER, a citizen of the United States, residing at Newark, in the county of Essex and State of New Jersey, have invented certain new and useful Improvements in Dynamo-Electric-Machine Armatures, of which the following is a specification.

This invention pertains to dynamo electric machines such as electric motors and generators. In particular it is directed to certain novel features in construction and arrangement of the armature or rotor element of such dynamo machines, all of which features contribute to secure a machine that is characterized by its simple and durable construction, and further by its comparatively high efficiency of operation.

While my invention is especially suited to motors and generators of comparatively small capacities, and while it especially finds a very desirable application when embodied in an electric motor of the above mentioned class, it is by no means limited to such a narrow range of service. Inasmuch as this invention involves such features as to especially recommend it for use in connection with motors of the type used for the purpose of furnishing the starting power for internal combustion engines and the like, I have chosen to describe the same with more or less reference to its application to such starting motors. However it is to be understood that this specification is merely descriptive and it is not intended to restrict my invention to any particular class of dynamo electric machines. It will be evident from the following description that the said invention in its broader aspects contemplates a vast field of application, being not only adapted to machines hereinbefore mentioned, but to various other types and classes.

Both theory and experiment have proven that the torque or turning effort of an electric motor, having a given potential applied to its terminals, depends directly upon three factors, namely: the value of the armature current, the intensity of field flux, and the number of armature conductors. But the designer is not permitted to confine his attention wholly to these factors for there are other considerations to be dealt with, such as mechanical strength and simplicity, cost of materials, and in the case of starting motors the factor of compactness is a very important one. Assuming that an electric motor, as for instance a starting motor, owing to the limited space available, is to have its dimensions confined to certain bounds. This fixes to a great extent the armature and field dimensions, and consequently makes that factor of torque, dependent upon the number of conductors, a constant quantity. With this factor established it is evident that, in order to produce a motor of maximum turning effort, there must be incorporated in the design those features which permit the largest possible values of armature current and field flux. In series motors (which type is especially suited for engine starting purposes) both the field and armature current, according to well known laws, varys inversely as the resistance. Hence any feature which decreases the resistance of these circuits, without otherwise affecting the practice of good design, is productive of higher torque, greater efficiency, and is consequently looked upon with considerable favor.

With the foregoing in mind my invention has as one of its objects the production of a motor in which the armature is so constructed as to decrease its electrical resistance to a minimum, thereby enabling the greatest amount of current to flow through it conductors with the result of a large turning effort.

Another object is to further increase the motor's torque, especially in the case of series machines, by employing an armature of the above mentioned construction, which owing to its low resistance decreases the total resistance of the machine and thereby allows the field to receive its maximum excitation.

Another object is to effect a great saving in the cost of manufacture by eliminating entirely the ordinary commutator heretofore used, thus economizing in both material and space as well as the labor and time of construction and assembly.

In conjunction with eliminating the commutator this invention has as still another object to make the active length of armature conductor a greater percentage of the total length by doing away with the commutator risers, and by substituting a simple means to take the place of the end turns ordinarily used.

With numerous other objects in view, all of which will become apparent from the following description, my invention may be briefly summarized as consisting of certain novel features which secure a dynamo electric machine having a simple and economic construction, together with a high efficiency of operation.

In the accompanying drawings which form a part of this specification, and wherein like reference characters identify corresponding parts in the several views:

Figure 1 is a longitudinal elevation, partly in section, showing a dynamo electric machine provided with an armature embodying the features of my invention.

Figure 2 is a sectional elevation taken on line 2—2 of Figure 1.

Figure 3 is a fragmentary view showing a longitudinal elevation and section of a dynamo machine same as shown in Figure 1 but having shorter armature conductors and only one type of brush arrangement shown in Figure 1. In this view a portion of the armature is broken away to illustrate the manner in which the armature conductors are disposed.

Figure 4 is a sectional view taken on line 4—4 of Figure 3.

Figure 5 is a fragmentary view illustrating the development of the armature winding; and the method of making the end connections of the armature conductors.

Figures 6, 7, and 8 are enlarged fragmentary views illustrating three methods in which the end connections of the armature conductors may be made.

Figures 9, 10, and 11 are three views similar to Figures 6, 7, and 8 showing other methods of fastening the conductors together.

Figure 12 is a view similar to Figures 6 and 7 but showing the conductors to be secured together by means of a rivet.

Inasmuch as my invention is more particularly directed to the armature of dynamo machines the other parts of the machine as shown in the drawings are more or less of a conventional character. Other elements have been eliminated for the sake of facility in reading the drawing, and to give a clearer understanding of said invention. In said drawings 1 is the housing frame of the machine which serves also as a support and yoke for the pole pieces 2. These pole pieces may be of any desirable number, being secured in place as by screws 3 and each being provided with a field coil 4. Plates 5 and 6 are suitably attached to the ends of frame 1 forming a housing for the several elements and also providing the usual bearings for the rotor member. Journaled in said end plates is the shaft 7 whereupon the armature 8, which is made of suitable magnetic material, is mounted to rotate between the field poles 2. In accordance with my invention the armature 8 is constructed as shown in a manner such that the usual commutator is not needed, thus effecting a considerable saving in copper, insulation, and decreasing materially the total length of the machine. To accomplish this desirable end I have made provision whereby the conductors 9 of the upper layer, which in the previous practice have been connected to the conductors 10 of the lower layer by soldering the ends of the same to successive commutator risers, may be directly joined together by a simple fastening means such that the least possible amount of copper is needed, and furthermore dispensing with the use of mica or other insulation between the bars, although a narrow strip of fiber or leatheroid 29 may be inserted circumferentially between the two layers of conductors as they emerge from the armature core, and in some cases a piece of cotton sleeving may be slid over the alternate lower ends 10 to prevent the conductors 10 from contacting with each other. It is to be understood that after the windings are in place the entire armature is dipped in an insulating varnish, such as "baekerlite" and then baked. By upper and lower layers I refer to that construction in which the armature is wound so that the conductors in the same slot are disposed one above the other. However my invention is of course applicable to many other forms and methods of armature winding wherein it is necessary to connect together the ends of the several conductors in various schemes according to the particular type of winding.

I will now describe the method of connecting said armature conductors together. Each conductor 9 after leaving the armature slot (not shown) passes forward at an angle to the axis of the armature and has its extreme end, as seen in Figures 6, 7, 11, and 12 bent to give a portion 11 parallel to said axis. The corresponding conductor 10 to which it is to be connected is similarly shaped. These ends may then be securely fastened together by either type of connector 12, 13, or 14 or by rivet 28 as seen in Figures 6, 7, 11 and 12 respectively. If desirable the ends of conductors 9 and 10 may be tinned and said connectors soldered on. Figure 8 shows conductors 9 and 10 to be upset to give the oppositely disposed portions 15 and 16 and the pocket 17 which serves as a means for soldering the conductors together. Figures 9 and 10 show two other methods of connecting said conductors. By the methods of connection shown in Figures 6, 7, 11, and 12 the conductors may be shaped and joined to each other after they have been placed in the armature slots and hence these methods are adapted to either the open or closed slot armature. The forms shown in Figures 8, 9, and 10 owing to the upset portions are more especially adapted for the open slot type of armature.

Referring now to Figures 1 and 2, the conductors 9 after being connected to the corresponding conductors 10 as above described are machined on their side exterior surface to present a true cylindrical surface concentric with the shaft 7 and upon which the usual brushes are adapted to bear. Said connections are shown at 18. Cooperating with the machined surface of conductors 9 are brushes 19 of any suitable number and which serve to convey the current to and from the armature 8. Said brushes are supported by holders 20 which are pivotally mounted upon the end plate 5. A spring 21 holds each brush firmly upon the armature conductors. The conductors may also be machined on their end exterior surface and brushes 22, of any desired number, carried on suitable holder 23 may cooperate therewith and in conjunction with the brushes 19. This latter arrangement of brushes will be referred to more in detail later. At the rear end of the machine the conductors instead of being bent under, as is usually the custom, may be connected together in the same manner as that described with reference to the front end. By this method material is not only saved by eliminating the usual commutator, risers, insulation, etc., but the length of conductor necessary for the connections is reduced with the result that the active portion of each conductor which cuts the field flux is a greater percentage of the total length. In other words by disposing the conductors at an angle to the shaft externally of the slots, and by utilizing my improved connecting means I am enabled to make the necessary end connections with a minimum length of conductor.

In Figure 3 wherein the end brush arrangement of Figure 1 is shown, I have reduced the length of the armature conductors still farther than that shown in Figure 1 by arranging to have the brushes bear on the end connections 18, which after the conductors are assembled are turned to present a smooth surface for said brushes. In this case brushes 22, which may be of any suitable number, are contained in brushholders 23 of insulating material. Said brushes, which are constructed of low resistance material, are connected by heavy flexible copper pigtails 24 to terminals 25 and are pressed against the ends of connections 18 by means of springs 26. These brush holders are arranged to be supported by the end plate 27. The showing of said brushes and holders is somewhat conventional inasmuch as the same forms no part of the present invention. In this embodiment of my invention it will be seen that the construction of the armature as in Figure 3 is the same as the rear end construction of Figure 1. In said Figure 3 a portion is broken away to show the conductors 10 on the underside as they come from their respective armature slots to be connected to conductors 9 as above described.

By constructing an armature as above described it will thus be seen that there are to be derived many useful and advantageous features. In the construction shown in Figures 1 and 3 the armature conductors themselves serve the functions of a commutator, while due to the rigidity afforded by my method of arranging, treating and connecting the conductors the use of any insulation between said conductors is dispensed with, except that which is used in the slots and as otherwise mentioned heretofore. Again by doing away with the commutator and its risers the end of the armature is given an open formation. In the ordin. y machine said commutator, risers and conductors form an enclosed space which affords a receptacle for dirt and is especially apt to collect bits of solder when said conductors are being fastened to the commutator risers. Such conditions are liable to produce short circuits. The open formation of my armature eliminates all such dangers by making it possible to inspect and clean the same if necessary, and furthermore this open formation serves as a cooling means for the armature, and further allows the shaft bearings to project inwardly as shown in Figure 3, thereby materially shortening the machine.

Also in machines of the ordinary construction it is necessary to undercut the insulation between the commutator bars due to the fact that mica and the like being more or less uniform does not wear away evenly with the commutator bars. This means that as copper bars become worn the insulation therebetween, unless undercut, is liable to project beyond the surface of the commutator and cause the brushes to chatter. Furthermore the commutator bars themselves owing to variations in the hardness of material used are liable to wear unevenly, and since said bars pass under the brushes at right angles thereto any such unevenness likewise produces a chattering of said brushes. Such conditions are unavoidable where the ordinary commutator is employed and invariably result in rapid wear of the brushes, increased resistance, sparking, and unsatisfactory commutation in general. I have avoided all such insulation troubles, and in the embodiment shown in Figures 1 and 2 by arranging to have the brushes bear on the cylindrical surface formed by the angularly disposed conductors said conductors, instead of contacting with the brushes abruptly, approach and pass under said brushes at an angle, thereby avoiding vibration and insuring smooth operation.

Another very desirable feature of my invention resides in the fact that owing to the manner of connecting the conductors together at both ends of the machine, brushes may be used if desirable at the rear end as well as the front end. It is often necessary to subdivide and reduce the armature current, which requirement may be accomplished by an armature of the character herein described.

The efficiency and usefulness of an electric motor involving my invention will be readily recognized when such motor is employed for the purpose of starting gas engines. In such cases where it is customary to use storage batteries as the source of power, a great deal of difficulty is experienced in cold weather with the inability of the motor to give a sufficient turning effort. This is due to the fact that the capacity of the battery is greatly reduced at low temperatures, and while heavy leads and good connections may be used yet it is often the case that the motor is incapable of producing the necessary torque to start the engine. As hereinbefore described this invention provides a motor having a comparatively low resistance with the result that the battery, even though its capacity is reduced, is capable of forcing sufficient current through the motor to produce a heavy torque under the most severe conditions.

In no branch of the electrical field has development been so rapid as that pertaining to electrical equipment on moving vehicles such as automobiles, and the requirements have become rather exacting, particularly as to the cost and performance of the starting motor used for cranking the engine. And while many designs have been worked out and put into practical operation, I believe I am the first to develop a starting motor without the use of a commutator, and one in which the performance has been improved by reason of the more efficient manner of arranging and utilizing the materials entering into the construction of the motor. While I have shown in general the way in which my invention may be put in practice I do not wish to be limited to the exact details shown and described herein as it will be apparent that many changes and alterations may be made without departing from the spirit of said invention and the scope of the appended claims.

Having thus described my invention what I claim is:

1. In an armature for an electric motor or dynamo, the combination of, a magnetic element having a continuous winding consisting of a plurality of layers of conductors arranged about the periphery of said magnetic element and projecting exteriorly beyond both ends thereof; said exteriorly projecting ends having no insulation between conductors and having the ends of the different layers disposed diagonally to the axis of said armature and further having the conductor ends of the outer layer connected to an inner layer in such a way that said connected ends are spaced concentrically about the armature axis whereby brushes may be operated on the uninsulated ends or sides of said conductors, or on both.

2. In an armature for an electric motor or dynamo, the combination of, an operating shaft having a magnetic element mounted thereon and carrying a continuous winding consisting of a plurality of conductors distributed and supported about its periphery thereof, said conductors having their ends brought out and arranged in pairs concentrically openly spaced apart in a manner so as to be self-supporting and leaving an open recess between the armature shaft and said concentrically arranged conductors for the purpose of ventilating said armature, said self-supporting and uninsulated conductor ends being adapted to receive brushes either on the ends or sides of said conductors or both for the purpose of conveying current to and from said winding.

3. In an armature for an electric motor or dynamo, the combination of an operating shaft having a magnetic member mounted thereon, a series of armature conductors supported about the periphery of said magnetic member extending beyond both ends thereof, the extending portions of said conductors being disposed diagonally of the axis of said shaft and having their end turns fashioned to present a portion parallel to said axis, a second series of armature conductors supported by the magnetic member similarly and oppositely fashioned with respect to the first series and so arranged that the parallel portions of one series of conductors come in line with those of the other series, and means for rigidly connecting together in openly spaced arrangement the end turns of said conductors so that said end turns are rendered self-supporting and adapted to receive brushes directly upon the ends of said conductor end turns or the sides of the end turns of the outer series of conductors or on both the ends and said sides.

4. An armature for an electric motor or dynamo, having a magnetic element with conductors disposed about the periphery thereof, said conductors having their end turns cylindrically disposed and openly spaced apart about the axis of said armature, and adapted to have brushes cooperate with either the ends or side of the end turns or both the ends and sides of the end turns of said conductors to convey current to and from said armature.

5. In an armature for an electric motor or dynamo, the combination of, an operating shaft having a core of magnetic material thereon, a plurality of conductors supported about the outer periphery of said core and connected into a continuous winding wherein said conductors have integral end turns projecting from the end of said core at an angle to the axis of the shaft, said end turns being openly spaced apart throughout their length and forming an interior recess around said shaft and an exterior surface concentric with the armature axis for the operation of brushes thereon.

6. An armature for an electric motor or dynamo having a continuous winding with a series of self supporting end turns adapted to have brushes cooperate either on the ends or sides or on both ends and sides of said end turns to convey current to and from said winding.

7. In an armature for an electric motor or dynamo, the combination of, an operating shaft having a core of magnetic material thereon, a plurality of conductors supported about the outer periphery of said core and connected into a continuous winding wherein said conductors have integral inner and outer ends turns projecting from the end of said core, said outer end turns being openly spaced apart throughout their length and forming a cylindrical surface concentric with the armature axis for the operation of brushes thereon.

8. In an armature for an electric motor or dynamo, an operating shaft and a magnetic element carried thereon, bearings for said shaft, a winding on said magnetic element consisting of a plurality of conductors having their end turns openly spaced apart and concentrically arranged around said shaft forming bearing surfaces for brushes and also forming an interior recess within which one or said bearings may project as and for the purposes described.

9. An armature for an electric motor or dynamo having a continuous winding with a series of uninsulated outer end turns and adapted to have brushes cooperate either on the ends or sides or on both the ends and sides of said end turns to convey current to and from said winding.

10. An armature for an electric motor or dynamo, having a magnetic element with conductors disposed about the periphery thereof, said conductors having their end turns openly spaced apart about the axis of said armature, and affording bearing surfaces for brushes at both the ends and sides of said end turns of said conductors to convey current to and from said armature.

11. An armature for an electric motor or dynamo having a continuous winding with a series of end turns formed, positioned relative to each other and connected as to be self-supporting and affording bearing surfaces for brushes to convey current to and from said armature winding.

12. An armature for an electric motor or dynamo including a magnetic element having an inner series of conductors supported about the periphery and extending beyond the ends thereof at an angle to the axis of rotation of said armature, an outer series of conductors supported by the magnetic member and extending beyond the ends thereof at an angle to the axis of rotation of said armature, said extending end turns of both series of conductors being so formed and connected as to complete a continuous winding with self-supporting end turns, said extending outer series end turns being openly spaced apart and fashioned to present a portion lying in a cylindrical surface substantially concentric with said axis thereby affording a bearing surface for brushes to convey current to and from said armature winding.

13. An armature for an electric motor or dynamo having a continuous winding with a series of self-supporting end turns adapted to have brushes cooperate on the end of said end turns to convey current to and from said winding.

14. An armature for an electric motor or dynamo having a core with conductors carried thereby and extending beyond the end thereof and connected into a continuous winding, said conductor extending portions having brush contact bearing surfaces arranged diagonally of the armature axis and openly spaced apart throughout the entire length of the said conductor extending portions.

In witness whereof I affix my signature.
HENRY E. BORGER.